United States Patent
Hahn et al.

(10) Patent No.: US 9,432,933 B2
(45) Date of Patent: Aug. 30, 2016

(54) METHOD AND APPARATUS FOR CONTROLLING A SMALL CELL ON OR OFF PROCEDURE

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 14/163,998

(22) Filed: Jan. 24, 2014

(65) Prior Publication Data

US 2014/0213239 A1   Jul. 31, 2014

Related U.S. Application Data

(60) Provisional application No. 61/757,063, filed on Jan. 25, 2013, provisional application No. 61/764,486, filed on Feb. 13, 2013, provisional application No. 61/766,701, filed on Feb. 20, 2013.

(51) Int. Cl.
*H04M 3/00* (2006.01)
*H04W 52/02* (2009.01)
*H04W 16/08* (2009.01)
*H04W 36/16* (2009.01)

(52) U.S. Cl.
CPC ......... *H04W 52/0206* (2013.01); *H04W 16/08* (2013.01); *H04W 36/165* (2013.01)

(58) Field of Classification Search
CPC .......... H04W 52/0206; H04W 16/08; H04W 36/165
USPC .................................. 455/418–420
See application file for complete search history.

(56) References Cited

U.S. PATENT DOCUMENTS

| 8,644,254 B2* | 2/2014 | Lee ..................... H04W 52/241 370/328 |
| 8,996,016 B2* | 3/2015 | Han .................. H04W 36/0072 370/230 |
| 2010/0234039 A1* | 9/2010 | Kwon ................. H04W 52/244 455/452.2 |

* cited by examiner

*Primary Examiner* — Shahriar Behnamian
(74) *Attorney, Agent, or Firm* — Lee, Hong, Degerman, Kang & Waimey

(57) ABSTRACT

The present application provides methods for controlling a small cell on or off procedure in a Small cell specific Gate Way (S-GW). One of the methods comprises steps of receiving a cell indication message from a Source Small Cell (SSC), the cell indication message includes a cell state change indication parameter indicating whether the SSC is to be on or off and a cell on/off timer parameter indicating a time duration for a cell on process or a cell off process; transmitting request message requesting to expand or shrink a cell coverage of a Target Small Cell (TSC) according to the cell state change indication parameter; and receiving a complete indication message indicating the cell on process or the cell off process is complete after the time duration indicated by the cell on/off timer parameter from the SSC.

14 Claims, 10 Drawing Sheets

FIG. 3
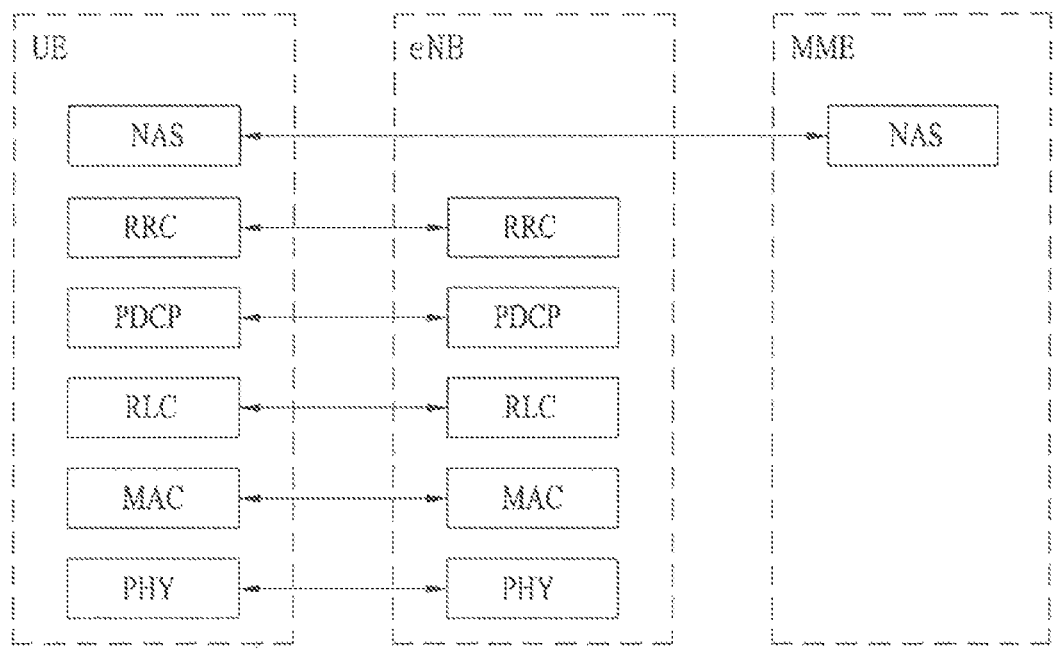
(a) Contol - plane protocol stack
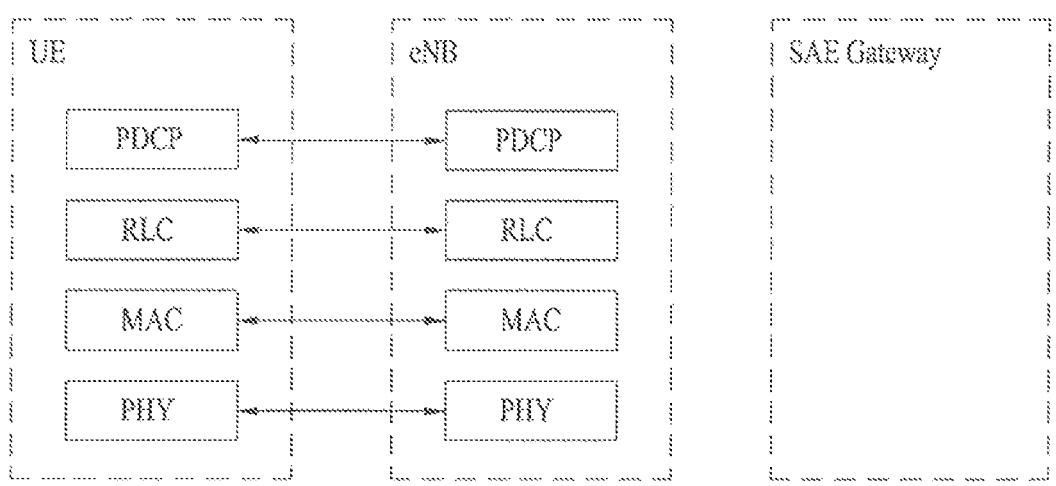
(b) User - plane protocol stack

METHOD AND APPARATUS FOR CONTROLLING A SMALL CELL ON OR OFF PROCEDURE

CROSS REFERENCE TO RELATED APPLICATIONS

Pursuant to 35 U.S.C. §119(e), this application claims the benefit of U.S. Provisional Patent Application Ser. Nos. 61/757,063, filed on Jan. 25, 2013, 61/764,486, filed on Feb. 13, 2013, and 61/766,701, filed on Feb. 20, 2013, the contents of which are all hereby incorporated by reference herein in their entirety.

TECHNICAL FIELD

The present invention relates to a wireless access system, and more particularly, to a method for controlling or supporting a small cell on or off procedure and apparatus thereof

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Currently, it is expected that the trend of mobile wireless networks will be toward the denser deployment of small cells for capacity enhancement. By increasing the number of small cells, end-users can be physically located closer to the network and therefore, the data capacity would be significantly improved.

However, when considering the deployment of large number of small cells, some technical issues made from the differences between small cell and macro cell deployment should be carefully identified and solved. As an example, although the turn on or off of cells is an important characteristic for macro cell deployment in terms of energy saving, such an aspect should also be emphasized for small cell deployment. The reason is that the dynamic turn on or off of large number of small cells might have some RAN impacts.

DISCLOSURE

Technical Problem

An object of the present invention is to provide a method for saving energy and enhancing energy efficiency on the small cell deploy environment.

Another object of the present invention is to provide methods for supporting cell on/off procedures for adaptively providing service to the UEs.

Another object of the present invention is to provide a method for optimized handover procedure when the cell on/off procedures are adapted to the network system.

Another object of the present invention is to provide a user equipment, a gate way and/or a base station supporting the above-described methods.

The objects achieved by the present invention are not limited to the above-described objects and those skilled in the art may consider other objects from the following description of the embodiments of the present invention.

Technical Solution

The present invention relates to methods and apparatuses for supporting or controlling a small cell on or off procedure.

The object of the present invention can be achieved by providing a method of A method for controlling a small cell on or off procedure in a Small cell specific Gate Way (S-GW). The method comprises steps of receiving a cell indication message from a Source Small Cell (SSC), the cell indication message includes a cell state change indication parameter indicating whether the SSC is to be on or off and a cell on/off timer parameter indicating a time duration for a cell on process or a cell off process; transmitting request message requesting to expand or shrink a cell coverage of a Target Small Cell (TSC) according to the cell state change indication parameter; and receiving a complete indication message indicating the cell on process or the cell off process is complete after the time duration indicated by the cell on/off timer parameter from the SSC.

The cell indication message may further include a time to start cell off parameter indicating when the cell on process or the cell off process is performed.

The method may further comprises step of receiving an expand complete indication message indicating a coverage of the TSC is expanded from the TSC, if the cell state change indication parameter indicates that the SSC it to be off; or receiving an shrink complete indication message indicating the coverage of the TSC is shrunk from the TSC, if the cell state change indication parameter indicates that the SSC it to be on.

In another aspect of the present invention, a method for controlling a small cell on or off procedure in a target small cell (TSC), the method comprises steps of receiving a request message from a Small cell specific Gate Way (S-GW), the request message includes a cell state change indication parameter indicating whether a source small cell (SSC) is to be on or off and a cell on/off timer parameter indicating a time duration for a cell on process or a cell off process; performing a expanding process or a shrinking process according to the cell state change indication parameter; transmitting a first complete indication message indicating expanding a coverage of the TSC or shrinking the coverage of the TSC after complete the expanding process or the shrinking process; and receiving a second complete indication message indicating the cell on process or the cell off process is complete after the time duration indicated by the cell off on/parameter from the SSC.

The another method further comprising steps of performing a synchronization process with a user equipment (UE) which is controlled by the SSC when the cell state change indication parameter indicating the SSC is to be turn off; and performing a Radio Resource Control (RRC) connection switching process with the UE for servicing a RRC connection to the UE.

In this case, the cell indication message may further include a time to start cell off parameter indicating when the cell off process is performed.

In addition, the method may further comprising steps of transmitting a user equipment (UE) context release message requesting to release resources of the UE to the SSC if the cell state change indication parameter indicating the SSC is to be turn off; or receiving the UE context release message requesting to release resources of the UE from the SSC if the cell state change indication parameter indicating the SSC is to be turn on.

In still other aspect of the present application, a Small cell specific Gate Way (S-GW) for controlling a small cell on or off procedure comprises a transmitter, a receiver, and a processor for controlling the small cell on or off procedure.

In this case, the processor is configured to receive a cell indication message from a Source Small Cell (SSC) by controlling the receiver, the cell indication message including a cell state change indication parameter indicating whether the SSC is to be on or off and a cell on/off timer parameter indicating a time duration for a cell on process or a cell off process; transmit request message requesting to expand or shrink a cell coverage of a Target Small Cell (TSC) according to the cell state change indication parameter, by controlling the transmitter; and receive a complete indication message indicating the cell on process or the cell off process is complete after the time duration indicated by the cell on/off timer parameter from the SSC, by controlling the receiver.

The cell indication message further includes a time to start cell off parameter indicating when the cell on process or the cell off process is performed.

The processor of the S-GW is further configured to receive an expand complete indication message indicating a coverage of the TSC is expanded from the TSC by using the receiver, if the cell state change indication parameter indicates that the SSC it to be off; or receive an shrink complete indication message indicating the coverage of the TSC is shrunk from the TSC by using the receiver, if the cell state change indication parameter indicates that the SSC it to be on.

In still other aspect of the present application, a target small cell (TSC) for supporting a small cell on or off procedure comprises a receiver, a transmitter, and a processor for supporting the small cell on or off procedure.

In this case, the processor is configured to receive a request message from a Small cell specific Gate Way (S-GW) by using the receiver, the request message including a cell state change indication parameter indicating whether a source small cell (SSC) is to be on or off and a cell on/off timer parameter indicating a time duration for a cell on process or a cell off process; perform a expanding process or a shrinking process according to the cell state change indication parameter; transmit a first complete indication message indicating expanding a coverage of the TSC or shrinking the coverage of the TSC after complete the expanding process or the shrinking process, by using the transmitter; and receive a second complete indication message indicating that the cell on process or the cell off process is complete after the time duration indicated by the cell on/off timer parameter from the SSC, by using the receiver.

The processor of TSC may be further configured to perform a synchronization process with a user equipment (UE) which is controlled by the SSC when the cell state change indication parameter indicating the SSC is to be turn on or off; and perform a Radio Resource Control (RRC) connection switching process with the UE for servicing a RRC connection to the UE.

The cell indication message may further include a time to start cell off parameter indicating when the cell on process or the cell off process is performed.

The processor of the TSC may be further configured to transmit a user equipment (UE) context release message requesting to release resources of the UE to the SSC if the cell state change indication parameter indicating the SSC is to be turn off; or receive the UE context release message requesting to release resources of the UE from the SSC if the cell state change indication parameter indicating the SSC is to be turn on.

The aforementioned aspects of the present invention are merely some of the preferred embodiments of the present invention and various embodiments to which the technical features of the present invention are applied will be obtained and understood from the following detailed description by those skilled in the art.

Advantageous Effects

According to the embodiments of the present invention, the following effects are obtained.

First, the energy efficiency of the whole network system can be increased since by controlling the cell on/off procedures. For example, if there are rare UEs in a specific small cell, it can turn off and another small cell which is located closely can provide the scheduling service to the UEs. Therefore, the energy efficiency can be increased and the network system can save energy compared to the prior network system.

Second, the UEs do not have to perform the legacy handover process when the cell on/off procedures are performed by using the proposed embodiments of the present application.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates the configurations of a radio interface protocol between the E-UTRAN and a UE.

MODE FOR INVENTION

Figure 1:
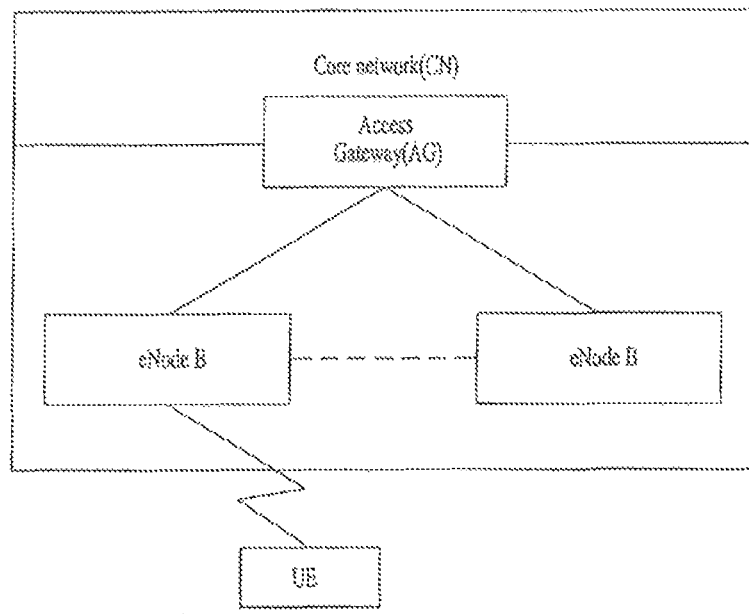
FIG. 1 illustrates a schematic structure a network structure of an evolved universal mobile telecommunication system (E-UMTS).

Embodiments of the present invention relate to methods for controlling or supporting a small cell on or off procedure and apparatus thereof.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), advanced base station (ABS), a macro cell, a small cell, or access point as necessary.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3$^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213, TS 36.321 and/or 3GPP TS 36.331, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like.

CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA).

The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

1. General 3GPP LTE/LTE_A System

FIG. 1 illustrates a schematic structure a network structure of an evolved universal mobile telecommunication system (E-UMTS).

An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs. A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
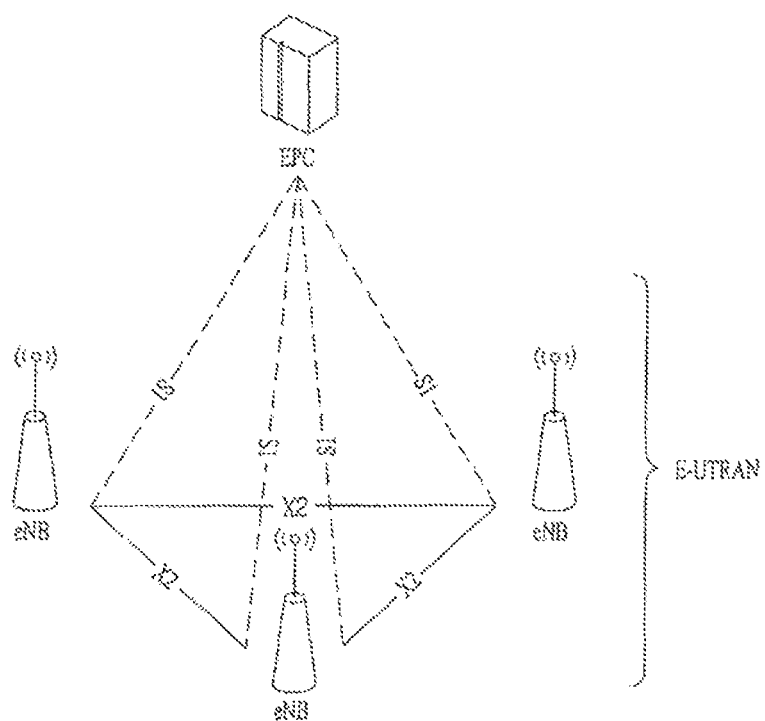
FIG. 2 illustrates a schematic structure of an Evolved Universal Terrestrial Radio Access Network (E-UTRAN).

FIG. 2 illustrates a network structure of an Evolved Universal Terrestrial Radio Access Network (E-UTRAN) system.

The E-UTRAN system is an evolved version of the conventional UTRAN system. The E-UTRAN includes base stations that will also be referred to as "eNode Bs" or "eNBs". The eNBs are connected through X2 interfaces. The X2 user plane interface (X2-U) is defined between eNBs. The X2-U interface provides non guaranteed delivery of user plane PDUs. The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like.

Each eNB is connected to User Equipments (UEs) through a radio interface and is connected to an Evolved Packet Core (EPC) through an S1 interface. The S1 user plane interface (S1-U) is defined between the eNB and the S-GW. The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

FIG. 3 illustrates the configurations of a control plane and a user plane of a radio interface protocol between the E-UTRAN and a UE based on the 3GPP radio access network standard.

The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. Multi-Carrier Aggregation Environment

A communication environment considered in the embodiments of the present invention includes all multi-carrier supporting environments. That is, a multi-carrier system or a multi-carrier aggregation system used in the present invention refers to a system for aggregating and utilizing one or more component carriers (CCs) having a bandwidth smaller than a target bandwidth, in order to support a target wide band.

In the present invention, multi-carrier refers to CA. CA includes both aggregation of contiguous carriers and aggregation of non-contiguous carriers. In addition, CA may be used interchangeably with the term "bandwidth aggregation".

Carrier Aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system.

For example, the existing LTE system may support bandwidths of 1.4, 3, 5, 10, and 20 MHz and an LTE_Advanced (LTE_A) system evolved from the LTE system may support a bandwidth greater than 20 MHz using only the bandwidths supported by the LTE system. Alternatively, the multi-carrier system used in the present invention may define a new bandwidth so as to support CA, regardless of the bandwidths used in the existing system.

The LTE-A system uses the concept of a cell in order to manage radio resources. The cell is defined as a combination of downlink resources and uplink resources, and the uplink resources are not mandatory. Accordingly, the cell may be composed of downlink resources alone or both downlink resources and uplink resources. If multi-carrier (that is, carrier aggregation) is supported, linkage between a carrier frequency (or a DL CC) of downlink resources and a carrier frequency (or a UL CC) of uplink resources may be indicated by a system information block (SIB).

A cell used in the LTE-A system includes a primary cell (PCell) and a secondary cell (SCell). The PCell refers to a cell operating on a primary frequency (e.g., a primary CC (PCC)) and the SCell refers to a cell operating on a secondary frequency (e.g., a secondary CC (SCC)). Only one PCell may be allocated to a specific UE and one or more SCells may be allocated to the specific UE.

The PCell is used to perform an initial connection establishment process or a connection re-establishment process at a UE. The PCell may be referred to as a cell indicated in a handover process. The SCell may be configured after radio resource control (RRC) connection establishment and may be used to provide additional radio resources.

The PCell and the SCell may be used as a serving cell. In the case of a UE which is in an RRC_connected state but in which CA is not set or a UE which does not support CA, one serving cell composed of only a PCell is present. In contrast, in the case of a UE which is in an RRC_connected state and in which CA is set, one or more serving cells may be present and all the serving cells include a PCell and one or more SCells.

After an initial security activation process begins, an E-UTRAN may configure a network which comprises a PCell that is initially configured in a connection establishment process and one or more SCells. In a multi-carrier environment, the PCell and the SCell may operate as respective CCs. That is, multi-carrier aggregation may be understood as being a combination of a PCell and one or more SCells. In the following embodiments, a primary CC (PCC) may be used as the same meaning as the PCell and a secondary CC (SCC) may be used as the meaning as the SCell.

3. Small Cell Deployment

According to section 2, a serving cell is described as the combination of DL and optionally UL resources. The linking between carrier frequency of DL resources and carrier frequency of UL resources is indicated in system information sent on the DL resources. In this case, a deployment where the capacity boosters can be distinguished from the cells offering basic coverage, the E-UTRAN cell providing additional capacity can be switched off in order to optimize the energy consumption when its capacity is no longer needed and to be re-activated on a demand basis.

3.1 Legacy Procedures

Hereinafter, the legacy procedures for a configuration update and a handover which performed by the UE and base stations.

Figure 4:
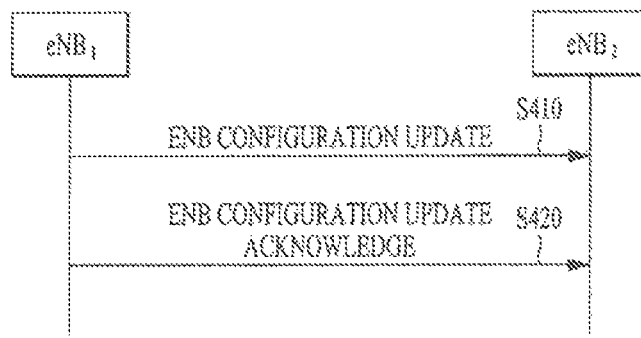
FIG. 4 illustrates the method for a legacy configuration update procedure between base stations.

FIG. 4 illustrates the method for a legacy configuration update procedure between base stations.

Referring to FIG. 4, the first base station (i.e., eNB1) initiates the procedure by sending an ENB CONFIGURATION UPDATE message to the second base station (i.e., eNB2) which is a peer base station. At this time, the ENB CONFIGURATION UPDATE message includes an appropriate set of up-to-date configuration data, including, but not limited to, the complete lists of added, modified and deleted served cells, the eNB1 has just taken into operational use (S410).

Upon reception of an ENB CONFIGURATION UPDATE message, eNB2 shall update the information for eNB 1. In addition, after successful update of requested information, eNB2 shall reply with the ENB CONFIGURATION UPDATE ACKNOWLEDGE message to inform the initiating eNB1 that the requested update of application data was performed successfully (S420).

In this case, the peer eNB2 receives an ENB CONFIGURATION UPDATE without any IE except for Message Type IE it shall reply with the ENB CONFIGURATION UPDATE ACKNOWLEDGE message without performing any updates to the existing configuration.

In addition, the eNB1 may initiate a further eNB Configuration Update procedure only after a previous eNB Configuration Update procedure has been completed.

Figure 5:
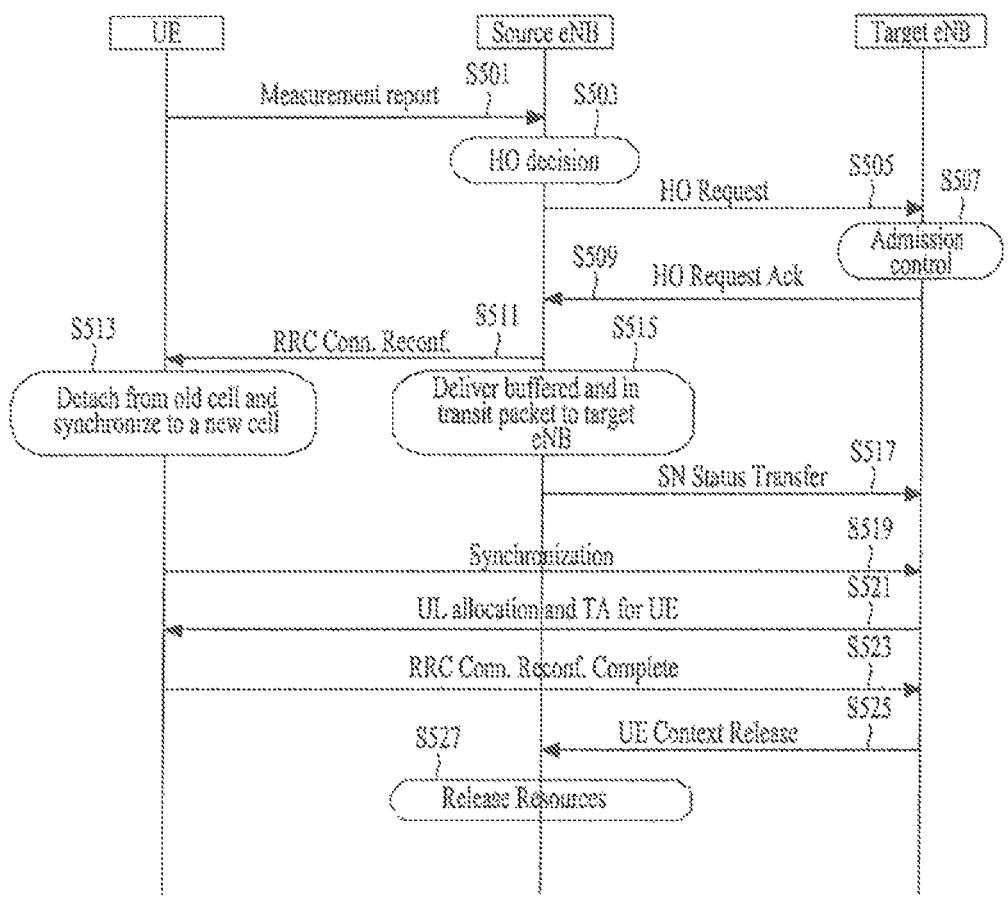
FIG. 5 illustrates one of the legacy connected mode handover methods.

FIG. 5 illustrates one of the legacy connected mode handover methods.

In FIG. 5, the network system comprises the UE, the source eNB, and the target eNB. In this case, the source eNB is a serving base station which is providing scheduling services to the UE and the target eNB is a target base station which the UE is willing to handover. In addition, the source eNB and the target eNB are the legacy base stations and macro base stations.

The network controls the UE mobility in RRC_CONNECTED and for the network controlled mobility in RRC__CONNECTED, handover is the only procedure which is currently defined. Generally, network triggers the handover procedure according to the radio conditions, and load. Such handover procedure is described in FIG. 5.

Referring to FIG. 5, the UE transmits the Measurement report message including a result of a measurement for neighboring cells to the source eNB (S501).

The source eNB is able to decide whether to perform the handover (HO) and the target eNB which the UE is to handover, and the source eNB transmits a HO request message to the target eNB in order to inform the HO (S503, S505).

The target eNB controls the admission of the UE and if the UE can be admitted, the target eNB transmits the HO request ACK message to the serving eNB (S507, S509).

The source eNB receiving the HO request ACK message transmit the RRC Connection Reconfiguration message to the UE for indicating to perform the HO procedure (S511).

The UE receiving the RRC Connection Reconfiguration message detaches from the old cell (i.e., the source eNB) and performs synchronization with the new cell (i.e., the target eNB), and the source eNB delivers buffered and in transit packet to the target eNB (S513, S515).

In order to transmit the buffered data or in transit packet, the source eNB transmit Sequence Number (SN) Status Transfer message to the target eNB (S517).

After that, the UE performs the synchronization procedure with the target eNB (S519), and the target eNB transmits uplink resources allocation information and timing advance (TA) information for the UE (S521).

The UE transmit the RRC Connection Reconfiguration complete message to the target eNB based on the uplink resource allocation information and the TA information (S523).

If the target eNB received the RRC Connection Reconfiguration complete message from the UE, the target eNB transmit the UE context release message requesting deletion of the information related to the UE (S525).

The source eNB receiving the UE context release message releases the resources for the UE and the HO procedure is completed (S527).

As described above, FIG. 5 illustrates legacy HO procedure which is performed by the UE. That is, whenever the eNB which provides scheduling service to the UE is changed, the UE should perform the handover procedure illustrated in FIG. 5. However, the method illustrated in FIG. 5 is not proper to the small cell environments. Because there are a lot of small cells will be deployed in a specific area (especially a cell area of the macro base station), if the UE perform the handover procedure of FIG. 5, the energy consumption of the UE will be extremely increased and the network overhead will also be increased.

Accordingly, by considering the deployment of future denser small cells, we think one of the features of such deployment is the dynamic on/off of small cells. To achieve this, current X2 procedure needs to be enhanced. Also, when we consider the deployment of small cells with dynamic on/off states, current handover mechanism needs to be optimized in terms of signaling overhead and latency. This is due to the intrinsic feature of small cells where the coverage of small cell is not so large and such feature inevitably results in frequent cell changes, e.g., handover between hyper-dense small cells.

3.2 Deployment Scenario of Small Cells

The important point of the present application is that network controls the expanding or shrinking of small cell based on the information sent from the neighbor small cell that is going to be turned on or off soon. Such information can contain the period of turning on or off, the timing of turning on or off, etc.

Another point of proposed method is that network controls the mobility of RRC connected UE based on the information such as the state change due to the neighbor small cell on or off. The information can further contain the period during which the RRC connection should be switched to the target.

As an example, the target small cell can be a cell that will expand its coverage and thus can provide service to the UEs on behalf of the source small cell. In such case, the source small cell can be a cell that will turn its power off soon and thus cannot give service to UEs. Alternatively, the source small cell can be a cell that will shrink its coverage and cannot accommodate the UEs in its coverage. In this case, the target small cell can be a cell that will turn its power on soon and can give service to the UEs on behalf of the source small cell.

Figure 6:
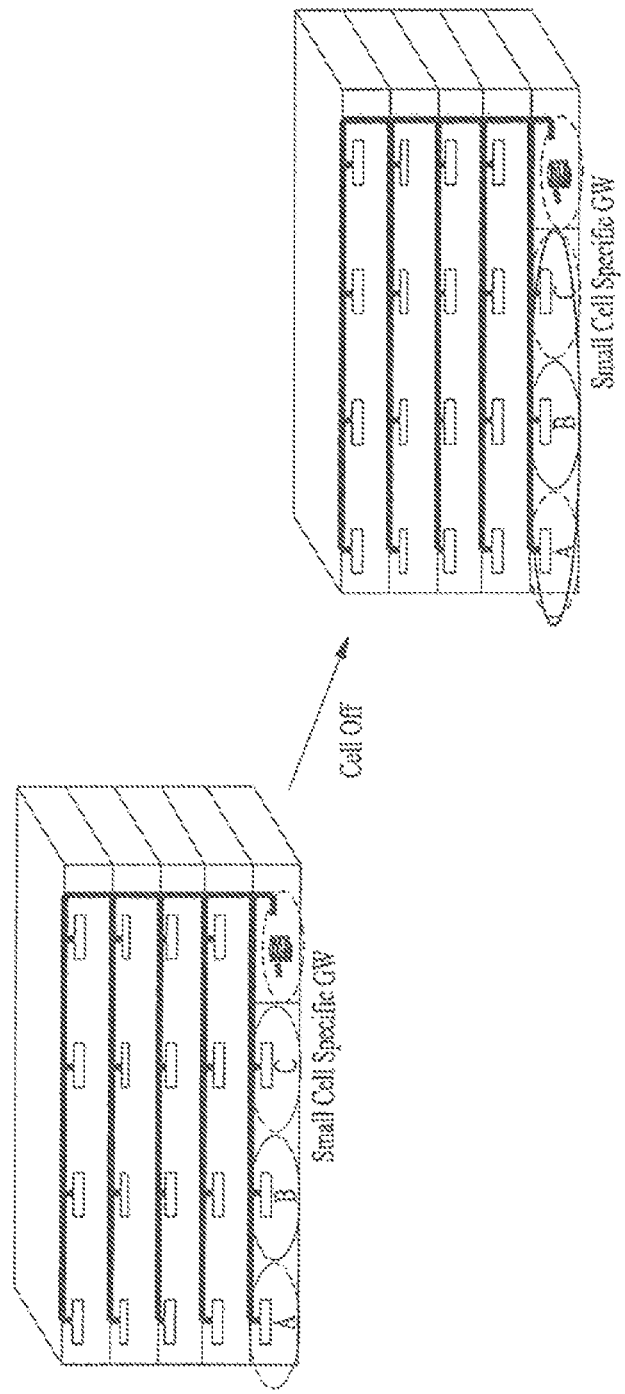
FIG. 6 illustrates the deployment scenario of Small Cell Specific Gateway controlled small cells with dynamic on or off states.
Figure 7:
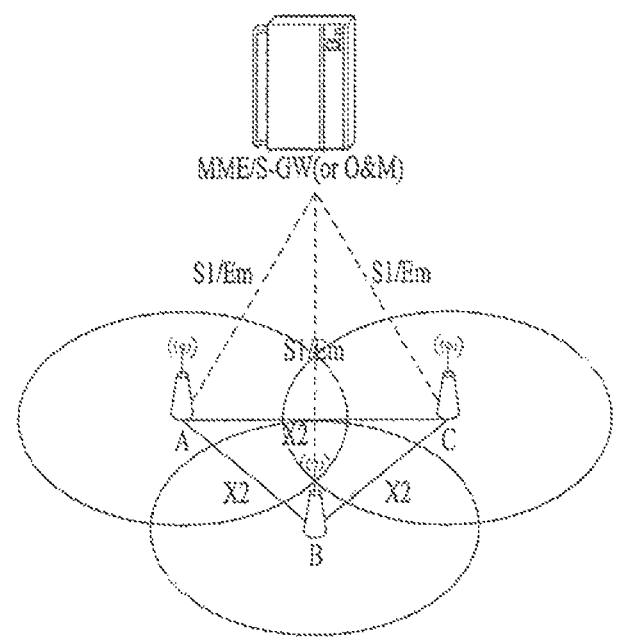
FIG. 7 illustrates the deployment scenario of MME/S-GW (or O&M) controlled small cells with dynamic on or off states.

FIG. 6 illustrates the deployment scenario of Small Cell Specific Gateway controlled small cells with dynamic on or off states and FIG. 7 illustrates the deployment scenario of MME/S-GW (or O&M) controlled small cells with dynamic on or off states.

Referring to FIGS. 6 and 7, there are 3 small cells A, B, and C. Especially, FIG. 6 represents that the small cells are deployed on a building and FIG. 7 represents the small cells are controlled by the MME/S-GW. Assume that the small cells A and C are going to be turned off soon. In such case, the small cell B should expand its coverage to provide service to the UEs on behalf of the small cells A and C. On the contrary, in case the small cells A and C are going to be turned on again soon, the small cell B should shrink its coverage to leave the UEs back to the small Cells A and C. All such coordination is controlled via the Small Cell Specific GW.

Also, the small cell B which has expanded is going to be turned off soon. In such case, the small cells A or C should expand their coverage to provide service to the UEs on behalf of the small cell B. On the contrary, in case the small cell B is going to be turned on again soon, the small cells A and C should shrink its coverage to leave the UEs back to the small Cell B.

All such coordination is controlled via the MME/S-GW (or O&M) (see, FIG. 7). Then, the proposed methods apply to macro cell deployment scenario without distinction of Cell Type (ex. small cell or macro cell, etc.)

The Small Cell Specific GW (or MME/S-GW, O&M) should notify the small cells under its control about the state changes of small cells. As an example, the Small Cell Specific GW should notify the state change of small cell that will be turned off soon to the small cell that should expand its coverage and give service to the UEs on behalf of the small cell that will be turned off. Conversely, the Small Cell Specific GW (or MME/S-GW, O&M) should notify the state change of small cell that will be turned on again soon to the small cell that should shrink its coverage and send the UEs back to the small cell that will be turned on again. For convenience, we describe the former set of small cell as on-and-off small cell and the latter set of small cell as shrink-and-expand small cell.

Besides, the small cell that will be turned off soon should notify the UEs in its coverage about the state change and the information needed for RRC connection switching. Such information can contain the identity of small cell that will extend its coverage in order to accommodate the UEs on behalf of the small cell that will be turned off soon. Such information can further contain the period during which the UEs should finish RRC connection switching to the target. This should be done after the source decides the target for RRC connection switching and makes a decision on RRC connection switching.

The proposed method should first be able to distinguish the on-and-off small cell from the shrink-and-expand small cell. This can be done by using the currently defined X2 procedure, e.g., X2 Setup. More specifically, the property of small cell, i.e., on-and-off or shrink-and-expand can be added into the X2 Setup messages as an IE (Information Element) of the served cell Information. By doing this, the network can know which small cell can act as on-and-off small cell and which small cell can act as shrink-and-expand small cell. This kind of property of small cell can be informed to the neighbor small cell through other X2 procedures such as eNB Configuration Update, etc.

In case a Small Cell Specific GW (or MME/S-GW, O&M) detects that the on-and-off small cells will be turned off soon, it forwards the Expand Request to the shrink-and-expand small cells for the UEs serviced by the corresponding on-and-off small cells. Conversely, if the Small Cell Specific GW detects that the on-and-off small cells will be turned on again soon, it transmits the Shrink Request to the corresponding shrink-and-expand small cells for leaving the UEs back to the on-and-off small cells. All information exchange illustrated above can be done either through the X2 (or S1/Em) interface (wired) or air interface (wireless) between network entities, e.g., Small Cell Specific GW and Small Cell (or MME/S-GW, O&M).

On the other hand, in case a source small cell is going to be turned off soon, for all RRC connected UEs in itself, it sends to the target small cell the Aggregated UE Context such as E-RAB QoS information and access stratum configuration information, etc. The transfer of such information should be done after the target small cell completes to expand its coverage and before the source small cell starts turning its power off.

Besides, in case a source small cell is going to be turned on soon again, the transfer of such information should be done before the target small cell starts shrinking its coverage and after the source small cell finishes turning its power on. The sending of Aggregated UE Context can be interpreted by the receiving target/source small cell as an implicit RRC connection switching request. After the source/target small cell broadcasts all the RRC connected UEs of its state change and target/source small cell related information, it sends the Aggregated SN Status of regarding UEs to the target/source small cell.

In case the UEs receive the information required for RRC connection switching through broadcasting, they start synchronization to the target/source small cell. After completing RRC connection switching to the target/source small cell, the UEs can resume communication. Finally, the target/source small cell transmits the UE Context Release to the source/target small cell for the source/target small cell to release the related UE contexts. Also, the target small cell informs the UEs in its control of the change of power level.

Figure 8:
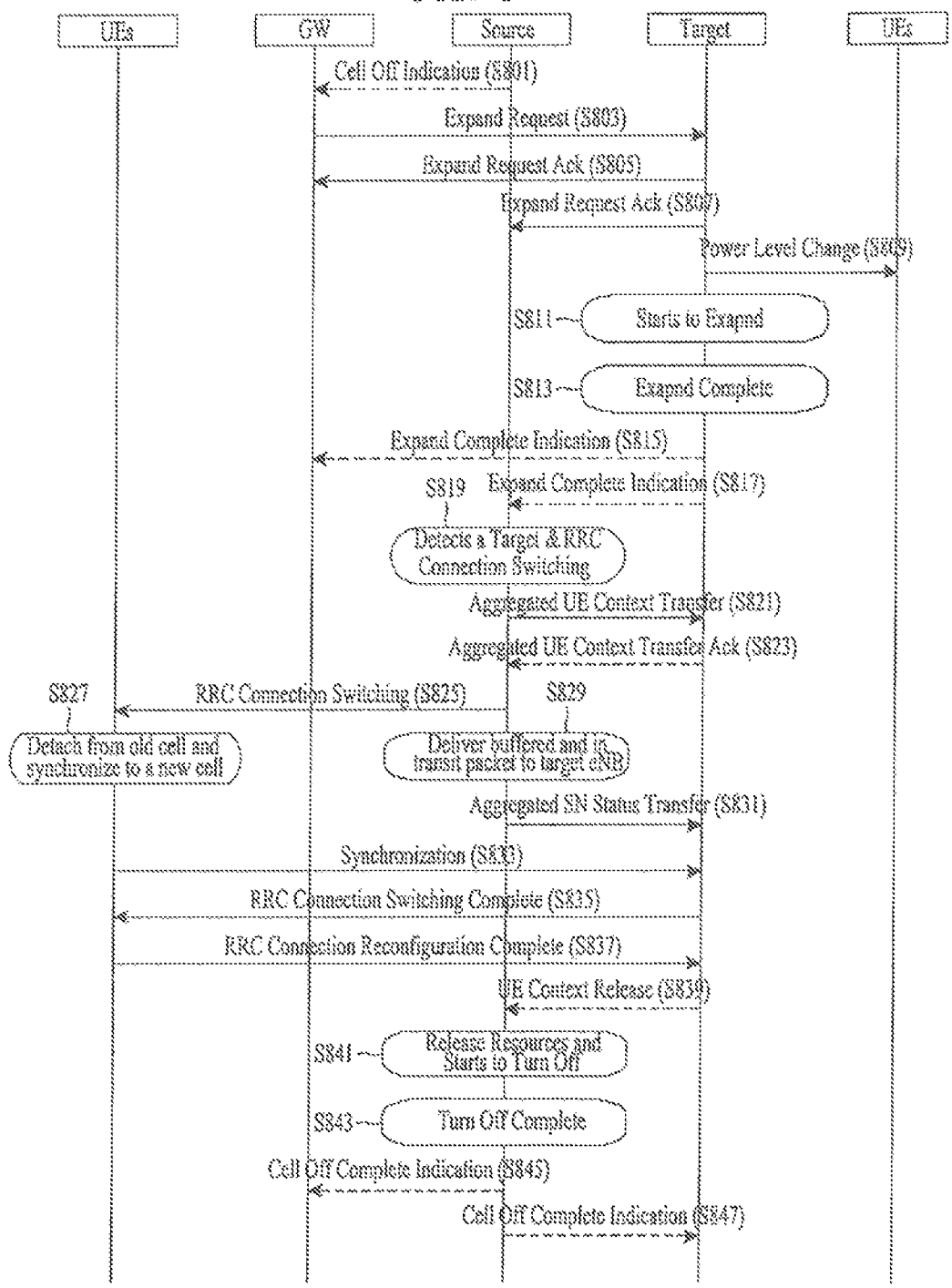
FIG. 8 illustrates a procedure for Expand Request through Small Cell Specific GW (or MME/S-GW).

FIG. 8 illustrates a procedure for Expand Request through Small Cell Specific GW (or MME/S-GW).

The network of FIG. 8 includes the Small cell specific Gate Way (S-GW, MME, or O&M), one or more source small cells (SSCs), one or more the target small cell (TSCs), and one or more UEs. However, for convenience of explanation of the present invention, FIG. 8 depicts just one SSC and one TSC but there exist un-shown SSCs and TSCs. In addition, the SSC is going to attempt turn off soon and the TSC is going to expand the cell coverage to provide the service to the UEs of the SSC. In this case, the SSC can be referred to an on-and-off small cell or a first cell, and the TSC can be referred to a shrink-and-expand small cell or a second cell.

Referring to FIG. 8, the SSC which is going to turn off soon transmit a Cell Off Indication message to the S-GW in order to notify the turn off state. The Cell Off Indication message includes a Cell State Change Indication parameter indicating the cell status, a Time to Start Cell Off parameter, and a Cell Off Timer parameter (S801).

By receiving the Cell Off Indication message, the S-GW can detect that the SSC which is the one-and-off small cell will be turned off soon by decoding the cell state change indication parameter. So, the S-GW notifies such state change to the TSC (i.e., the shrink-and-expand small cell) by transmitting the Expand Request message. The Expand Request message can be transferred via air interface (S803).

At the step of S803, the Expand Request message includes the Cell State Change Indication parameter representing the cell state whether the cell is turned off, the Time to Start Cell Off parameter representing when the cell is turn off, the Cell Off Timer indicating the duration of the cell off, and some other required information (e.g., information to identify the SSC). As an example, such information can contain the information for admission control at the TSC (i.e., shrink-and-expand small cells). Optionally, the Expand Request message can be originally sent from the SSC (i.e., on-and-off small cells).

The Cell Off Timer parameter can be set in a number of ways. For example, the Cell Off Timer can start (1) when the S-GW (or MME/S-GW, O&M) sends Expand Request message to the TSC or (2) when the TSC receive Expand Request message.

Regardless of the option stated above, the S-GW (or MME/S-GW, O&M) should clearly inform the TSCs about when the SSC will complete turning their power off. The aim of using the Time to Start Cell Off parameter and the Cell Off Timer parameter is that the TSC should finish expanding their coverage and switching of RRC connection for corresponding UEs before the SSC starts turning their power off.

Referring back to FIG. 8, the TSC receiving the Expand Request message determine that the TSC is able to expand and cover the coverage of the SSC. If the TSC is able to expand the cell coverage, the TSC transmits the Expand Request ACK message acknowledging the successful reception of the Expand Request message to the S-GW and the SSC (S805, S807).

The TSC broadcast to the UEs under themselves about their power level changes and start expanding their coverage by sending the Power Level Change message (S809).

At the step of S809, while broadcasting the Power Level Change message on power level changes, the TSC also broadcast the information about at which the changed power level will be applied and used for the corresponding UEs. Also, such information can also be broadcasted to the UEs on idle mode under the corresponding TSC.

The TSC starts to expand their cell coverage at the time point indicated by the Time to Start Cell Off parameter during a time period indicated by the Cell Off Timer parameter. After then the TSC completes the expansion of the cell (S811, S813).

Optionally, when the TSC finishes expanding their coverage, the TSC may transmit an Indication about the Expand Complete Indication message to the S-GW and corresponding SSCs (S815, S817).

When the SSC decides the TSC and the necessity of RRC connection switching, the SSC sends the Aggregated UE Context message to the TSC (S819, S821).

The Aggregated UE Context message can be interpreted by the TSC as the implicit RRC connection switching request for the UEs serviced by the SSC. In this case, the sending of the Aggregated UE Context message should be done after the SSC knows that the TSC completes expanding their coverage and before the SSC starts turning their power off.

Optionally, the TSC can then return the Aggregated UE Context Transfer ACK message indicating the successful reception of UE context related to the RRC Connection Switching (S823).

To reduce the processing time, alternatively, the sending of Aggregated UE Context Transfer message might also be done immediately after the SSC receives the Expand Request ACK message from the TSC.

The SSC notifies the RRC connected UEs under their coverage about the information regarding the identities of the TSC and the period during which the UEs should finish RRC Connection Switching to the TSC by sending the RRC Connection Switching message (S825).

The RRC Connection Switching message includes any data that can be used to identify the TSC. This is interpreted by the UEs as RRC connection switching request to the specified TSC. So, the UEs which have received the RRC Connection Switching message are able to detach from old cell and synchronize to a new cell that is the TSC (S827).

In addition, after transmitting the RRC Connection Switching message to the UEs, the SSC delivers the buffered packets to the TSC (S829).

The SSC then sends the Aggregated SN Status Transfer message to the TSC. The Aggregated SN Status Transfer message represents the packet sequence number to be transmitted to the TSC (S831).

During the procedure, optionally, the sequence of sending the information about the TSC and the Aggregated UE contexts Transfer message can be reversed. That is, after the SSC notifies the RRC connected UEs about the information identifying the TSCs first, the SSC sends the Aggregated UE contexts Transfer message to the TSCs.

After the TSC performs synchronization with the UEs, the TSC transmits the RRC Connection Switching Complete message to the corresponding UEs regarding this procedure and the UE Context Release message to the SSC, respectively (S835, S839).

The RRC Connection Switching Complete message includes uplink resource allocation information and timing advance (TA) information to be used in the TSC. So, the UEs receiving the RRC Connection Switching Complete message can transmit the RRC Connection Reconfiguration Complete message based on the uplink allocation information and the TA information to the TSC (S837).

When the SSC receives the UE Context Release message from the TSC, the SSC releases the resource for the UEs and then start turning its power off (S841).

Optionally, when the SSC finishes turning its power off, the SSC is able to send a Cell Off Complete Indication message indicating the cell off complete to the corresponding TSC and S-GW, respectively (S845, S847).

At the procedure illustrated in FIG. 8, the UEs do not need to report the measurement result for the RRC Connection Switching (as in the case of HO preparation) to the SSC.

When the UEs obtain the information about the identities of the TSC and the period during which the UEs should finish the RRC connection switching to the TSC by receiving the RRC Connection Switching message at the step S825. Then, the UEs can start synchronization to the TSC. The RRC Connection Switching message contains any data that can be used to identify the TSC. Such information can be sent from the network to the UEs by broadcasting message, such as a common control signaling (e.g., System Information (SI)). Besides, such information can be sent from the network to the UEs through RRC message.

When the RRC Connection Switching process is successfully finished to the TSC, the UEs resume communication with the network through the TSC.

Figure 9:
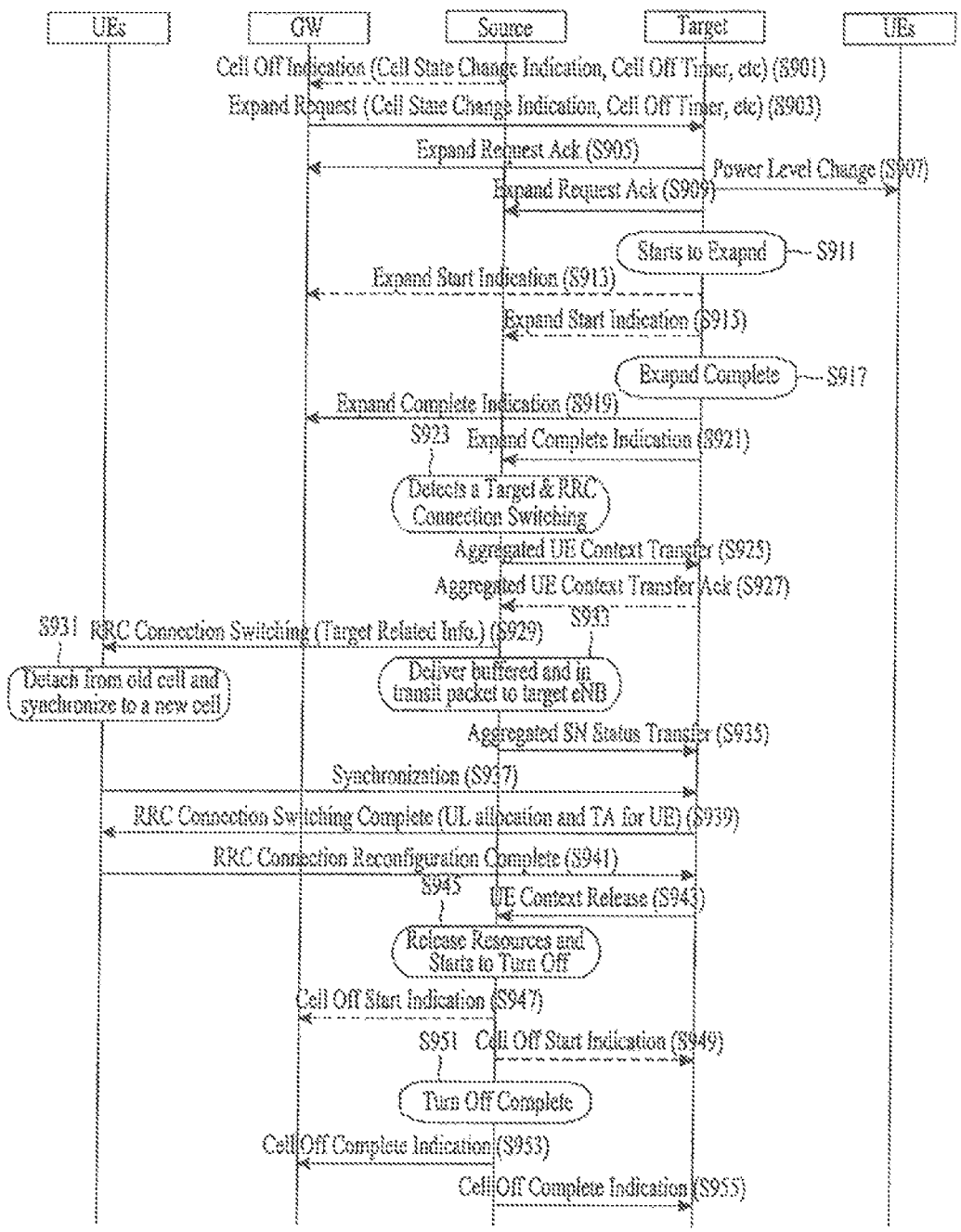
FIG. 9 illustrates an alternative method for the Expand Request through Small Cell Specific GW (or MME/S-GW).

FIG. 9 illustrates an alternative method for the Expand Request through Small Cell Specific GW (or MME/S-GW).

The network of FIG. 9 includes the Small cell specific Gate Way (S-GW, MME, or O&M), one or more source small cells (SSCs), one or more the target small cell (TSCs), and one or more UEs. However, for convenience of explanation of the present invention, FIG. 9 depicts just one SSC and one TSC but there exist un-shown SSCs and TSCs. In addition, the SSC is going to attempt turn off soon and the TSC is going to expand the cell coverage to provide the service to the UEs of the SSC. In this case, the SSC can be referred to an on-and-off small cell or a first cell, and the TSC can be referred to a shrink-and-expand small cell or a second cell.

Referring to FIG. 9, the SSC which is going to turn off soon transmit a Cell Off Indication message to the S-GW in order to notify the turn off state. The Cell Off Indication message includes a Cell State Change Indication parameter indicating the cell status and a Cell Off Timer parameter (S901).

By receiving the Cell Off Indication message, the S-GW can detect that the SSC (i.e., the one-and-off small cell) will be turned off soon by decoding the Cell State Change Indication parameter. So, the S-GW notifies such state change to the TSC (i.e., the shrink-and-expand small cell) by transmitting the Expand Request message. The Expand Request message can be transferred via air interface (S903).

At the step of S903, the Expand Request message includes the Cell State Change Indication parameter representing the cell statue whether the cell is turned off, the Cell Off Timer indicating the duration of the cell off, and some other required information (e.g., information to identify the SSC). As an example, such information can contain the information needed for admission control at the TSC (i.e., shrink-and-expand small cells). Optionally, the Expand Request message can be originally sent from the SSC (i.e., on-and-off small cells).

The Cell Off Timer parameter can be set in a number of ways. For example, the Cell Off Timer can start (1) when the S-GW (or MME/S-GW, O&M) sends Expand Request message to the TSC, or (2) when the TSC receive Expand Request message.

Regardless of the option stated above, the S-GW (or MME/S-GW, O&M) should clearly inform the TSCs about when the SSC will complete turning their power off. The purpose of using the Cell Off Timer parameter is that the TSC should finish expanding their coverage and switching of RRC connection for corresponding UEs before the SSC starts turning their power off.

Referring back to FIG. 9, the TSC receiving the Expand Request message determines that the TSC is able to expand and cover the coverage of the SSC. If the TSC is able to expand the cell coverage, the TSC transmits the Expand Request ACK message acknowledging the successful reception of the Expand Request message to the S-GW and the SSC (S905, S909).

The TSC broadcast to the UEs under themselves about their power level changes by sending the Power Level Change message, and then the TSC start expanding its coverage (S907, S911).

At the step S907, while broadcasting the Power Level Change message on power level changes, the TSC also broadcast the information about at which the changed power level will be applied and used for the corresponding UEs. Also, such information can also be broadcasted to the UEs on idle mode under the corresponding TSC.

Optionally, when the TSC starts expanding their coverage, the TSC may transmit an Expand Start Indication message to the S-GW and corresponding SSCs (S913, S915).

When the TSC finishes expanding its coverage (S917), the TSC transmits the Expand Complete Indication to indicate the completion of the cell expansion to the S-GW and the SSC (S919, S921).

When the SSC detects the TSC and the necessity of a RRC connection switching procedure, the SSC sends the Aggregated UE Context message to the TSC (S925).

Optionally, the TSC can then return the Aggregated UE Context Transfer ACK message indicating the successful reception of UE context related to the RRC Connection Switching (S927).

At the step of S925, the Aggregated UE Context message can be interpreted by the TSC as the implicit RRC connection switching request for the UEs serviced by the SSC. In this case, the sending of the Aggregated UE Context message should be done after the SSC knows that the TSC completes expanding their coverage and before the SSC starts turning their power off.

To reduce the processing time, alternatively, the sending of Aggregated UE Context Transfer message might also be done immediately after the SSC receives the Expand Request ACK message from the TSC.

The SSC notifies the RRC connected UEs under their coverage about the information regarding the identities of the TSC and the period during which the UEs should finish RRC Connection Switching to the TSC by sending the RRC Connection Switching message (S929).

The RRC Connection Switching message includes any data that can be used to identify the TSC. This is interpreted by the UEs as RRC connection switching request to the specified TSC. So, the UEs which have received the RRC Connection Switching message are able to detach from old cell and synchronize to a new cell that is the TSC (S931).

In addition, after transmitting the RRC Connection Switching message to the UEs, the SSC delivers the buffered packets to the TSC (S933).

The SSC then sends the Aggregated SN Status Transfer message to the TSC. The Aggregated SN Status Transfer message represents the packet sequence number to be transmitted to the TSC (S935).

During this procedure, the sequence of sending the information about the TSC and the Aggregated UE contexts Transfer message can be reversed. That is, after the SSC notifies the RRC connected UEs about the information identifying the TSCs first, the SSC sends the Aggregated UE contexts Transfer message to the TSCs.

After the TSC performs synchronization with the UEs (S937), the TSC transmits the RRC Connection Switching Complete message to the corresponding UEs regarding this procedure and the UE Context Release message to the SSC, respectively (S939, S943).

The RRC Connection Switching Complete message includes uplink resource allocation information and timing advance (TA) information to be used in the TSC. So, the UEs receiving the RRC Connection Switching Complete message can transmit the RRC Connection Reconfiguration Complete message based on the uplink allocation information and the TA information to the TSC (S941).

When the SSC receives the UE Context Release message from the TSC, the SSC releases the resource for the UEs and then start turning its power off (S945).

Optionally, when the SSC starts turning its power off, the SSC is able to send a Cell Off Start Indication message to indicate the cell off start to the S-GW and the TSC, respectively (S947, S949).

When the SSC finishes turning it power off (S951), the SCC transmits a Cell Off Complete Indication message indicating the cell off completion to the corresponding TSC and S-GW, respectively (S953, S955).

At the procedure illustrated in FIG. 9, the UEs do not need to report the measurement result for the RRC Connection Switching (as in the case of HO preparation) to the SSC.

When the UEs obtain the information about the identities of the TSC and the period during which the UEs should finish the RRC connection switching to the TSC by receiving the RRC Connection Switching message at the step S825. Then, the UEs can start synchronization to the TSC. The RRC Connection Switching message contains any data that can be used to identify the TSC. Such information can be sent from the network to the UEs by broadcasting message, such as a common control signaling (e.g., System Information (SI)). Besides, such information can be sent from the network to the UEs through RRC message.

When the RRC Connection Switching process is successfully finished to the TSC, the UEs resume communication with the network through the TSC.

Figure 10:
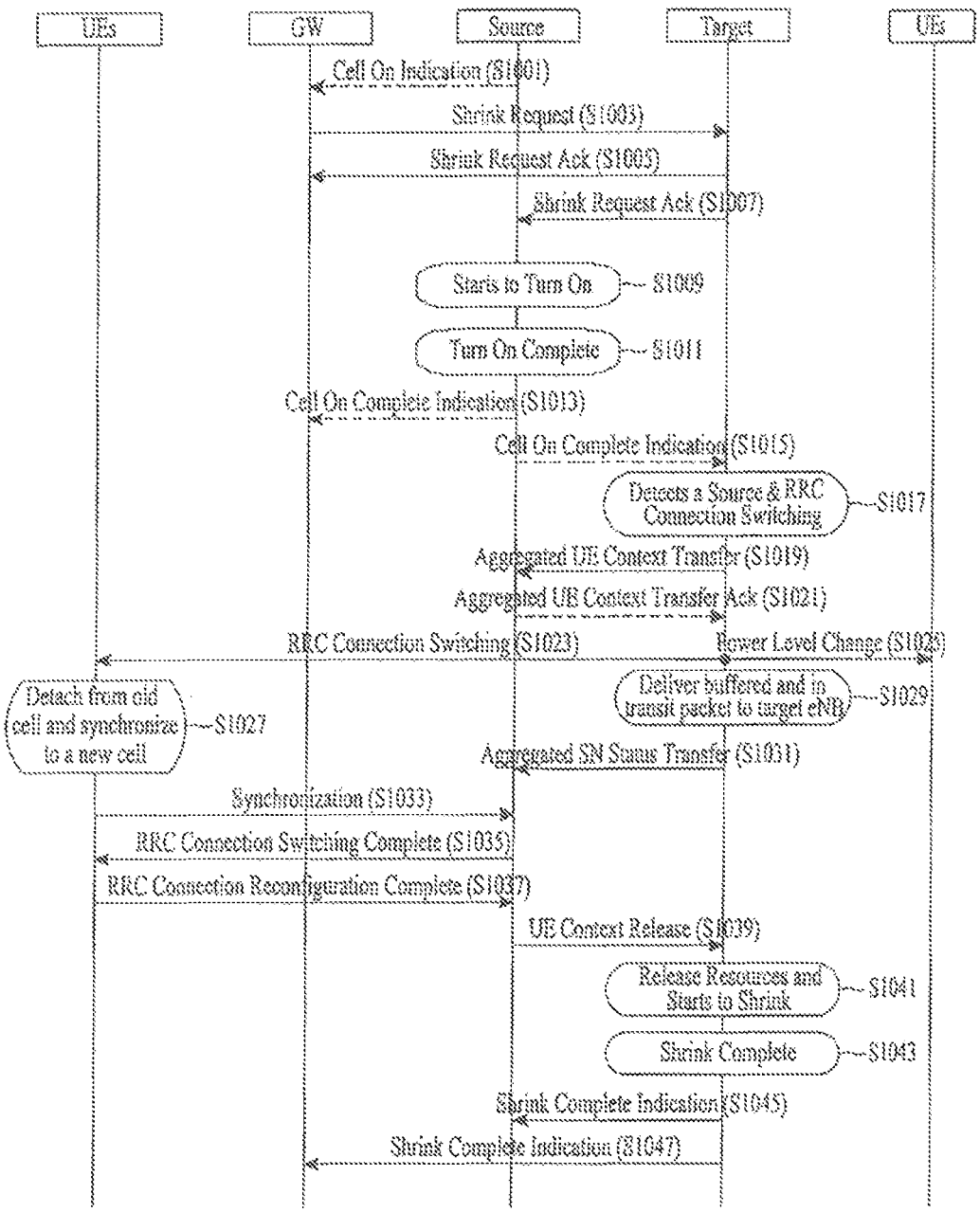
FIG. 10 illustrates a method for the Shrink Request through Small Cell Specific GW (or MME/S-GW).

FIG. 10 illustrates a method for the Shrink Request through Small Cell Specific GW (or MME/S-GW).

The network of FIG. 10 includes the Small cell specific Gate Way (S-GW, MME, or O&M), one or more Source small cells (SSCs), one or more the Target small cell (TSCs), and one or more UEs. However, for convenience of explanation of the present invention, FIG. 10 depicts just one SSC and one TSC but there exist un-shown SSCs and TSCs. In addition, the SSC is going to attempt turn on soon and the TSC is going to shrink the cell coverage. In this case, the SSC can be referred to an on-and-off small cell or a first cell, and the TSC can be referred to a shrink-and-expand small cell or a second cell.

Referring to FIG. 10 the SSC which is going to turn on transmits a Cell On Indication message to the S-GW in order to notify the turn on state. The Cell On Indication message includes a Cell State Change Indication parameter indicating the cell status, a Time to start Cell on, and a Cell On Timer parameter (S1001).

By receiving the Cell On Indication message, the S-GW can detect that the SSC (i.e., the one-and-off small cell) will be turned on soon by decoding the Cell State Change Indication parameter. So, the S-GW notifies such state change to the TSC (i.e., the shrink-and-expand small cell) by transmitting the Shrink Request message. The Shrink Request message can be transferred via air interface (S1003).

At the step of S1003, the Shrink Request message includes the Cell State Change Indication parameter representing the cell statue whether the cell is turned on, the Time to Start Cell on parameter indicating when the cell on process is start, and the Cell On Timer parameter indicating the duration for the cell on process, and some other required information (e.g., information to identify the SSC). As an example, such information can contain the information needed for admission control at the SSC (i.e., on-and-off small cells). Optionally, the Shrink Request message can be originally sent from the SSC.

The Cell On Timer parameter can be set in a number of ways. For example, the Cell On Timer can start (1) when the S-GW (or MME/S-GW, O&M) sends Shrink Request message to the TSC, or (2) when the TSC receive Shrink Request message.

Regardless of the option stated above, the S-GW (or MME/S-GW, O&M) should clearly inform the TSCs about when the SSC will complete turning their power on. The purpose of using the Cell On Timer parameter is that the TSC should not initiate shrinking its coverage before the SSC finishes turning its power on and switching of RRC connection for corresponding UEs.

Referring back to FIG. 10, the TSC transmits the Shrink Request ACK message acknowledging the successful reception of the Shrink Request message to the S-GW and the SSC (S1005, S1007).

After receiving the Shrink Request ACK message, the SSC starts power on process at the time indicated by the Time to Start Cell on parameter and performs the power on process during the time period indicated by the Cell on Timer (S1009, S1011).

Optionally, when the SSC finishes turning their power on, the SSC transmits the Cell On Complete indication message indicating the cell on process is complete to the S-GW (or MME/S-GW, O&M) and corresponding the TSC, respectively (S1013, S1015).

When the TSC detects the SSC and the necessity of RRC Connection Switching, the TSC transmits the Aggregated UE Context Transfer message to the SSC (S1019).

The Aggregated UE Context Transfer message can be interpreted by the SSC as the implicit RRC Connection Switching request for the UEs serviced by the TSC. In this case, the sending of such information should be done after the TSC knows that the SSCs completes turning its power on and before the TSC initiates shrinking its coverage.

Optionally, the SSC returns the Aggregated UE Context Transfer ACK message to indicate to the TSC about the successful reception of UE Context related to the RRC Connection Switching (S1021).

As an alternate option, in order to reduce the processing time, the sending of Aggregated UE Context Transfer message might also be done immediately after the SSC receives the Shrink Request AAC from the TSC.

The TSC transmits the RRC Connection Switching message to the RRC connected UEs under its coverage. The RRC Connection Switching message includes information related to the identities of the SSC and the period during which the UEs should finish RRC Connection Switching to the SSC. Such information includes any data that can be used to identify the SSC. This is interpreted by the UEs as the RRC Connection Switching Request to the specified SSC (S1023).

The TSC broadcast to the UEs under itself about the power level change. While broadcasting the indication on power level changes, the TSC also broadcast the information about at which the changed power level will be applied and used for the corresponding UEs. Besides, such information can be broadcasted to the UEs on idle mode under the TSC (S1025).

During the process, optionally, the sequence of sending the information about the SSC and the Aggregated UE Contexts can be reversed. That is, after the TSC notifies the RRC connected UEs about the information identifying the SSC first, the TSC sends the Aggregated UE Contexts Transfer message to the SSC.

To reduce the processing time, alternatively, the sending of Aggregated UE Context Transfer message might also be done immediately after the SSC receives the Shrink Request ACK message from the TSC.

The RRC Connection Switching message includes any data that can be used to identify the SSC. This is interpreted by the UEs as RRC connection switching request to the specified SSC. So, the UEs which have received the RRC Connection Switching message are able to detach from old cell (i.e., the TSC) and synchronize to a new cell that is the SSC (S1027).

In addition, after transmitting the RRC Connection Switching message to the UEs, the TSC delivers the buffered packets to the SSC (S1029).

The TSC then sends the Aggregated SN Status Transfer message to the SSC. The Aggregated SN Status Transfer message represents the packet sequence number to be transmitted to the SSC (S1031).

During the procedure, optionally, the sequence of sending the information about the SSC and the Aggregated UE contexts Transfer message can be reversed. That is, after the TSC notifies the RRC connected UEs about the information identifying the SSC first, the TSC sends the Aggregated UE contexts Transfer message to the SSC.

After the SSC performs synchronization with the UEs, the SSC transmits the RRC Connection Switching Complete message to the corresponding UEs regarding this procedure (S1035).

The RRC Connection Switching Complete message includes uplink resource allocation information and timing advance (TA) information to be used in the SSC. So, the UEs receiving the RRC Connection Switching Complete message can transmit the RRC Connection Reconfiguration Complete message based on the uplink allocation information and the TA information to the SSC (S1037).

After that, the SSC transmits the UE Context Release message requesting that the TSC release the resources for the UEs. When the TSC receives the UE Context Release message from the SSC, the TSC releases the resource for the UEs and then start to shrink its coverage (S1039, S1041).

When the TSC finishes shrinking its coverage, the TSC transmits a Shrink Complete Indication message indicating the shrinking is finished to the corresponding SSC and S-GW, respectively (S1045, S1047).

At the procedure illustrated in FIG. 10, the UEs do not need to report the measurement result for the RRC Connection Switching (as in the case of HO preparation) to the TSC.

When the UEs obtain the information about the identities of the SSC and the period during which the UEs should complete the RRC connection switching to the SSC by receiving the RRC Connection Switching message at the step S1023. Then, the UEs can start synchronization to the SSC. The RRC Connection Switching message contains any data that can be used to identify the SSC. Such information can be sent from the network to the UEs by broadcasting message, such as a common control signaling (e.g., System Information (SI)). Besides, such information can be sent from the network to the UEs through RRC message.

When the RRC Connection Switching process is successfully finished to the SSC, the UEs resume communication with the network through the SSC.

Figure 11:
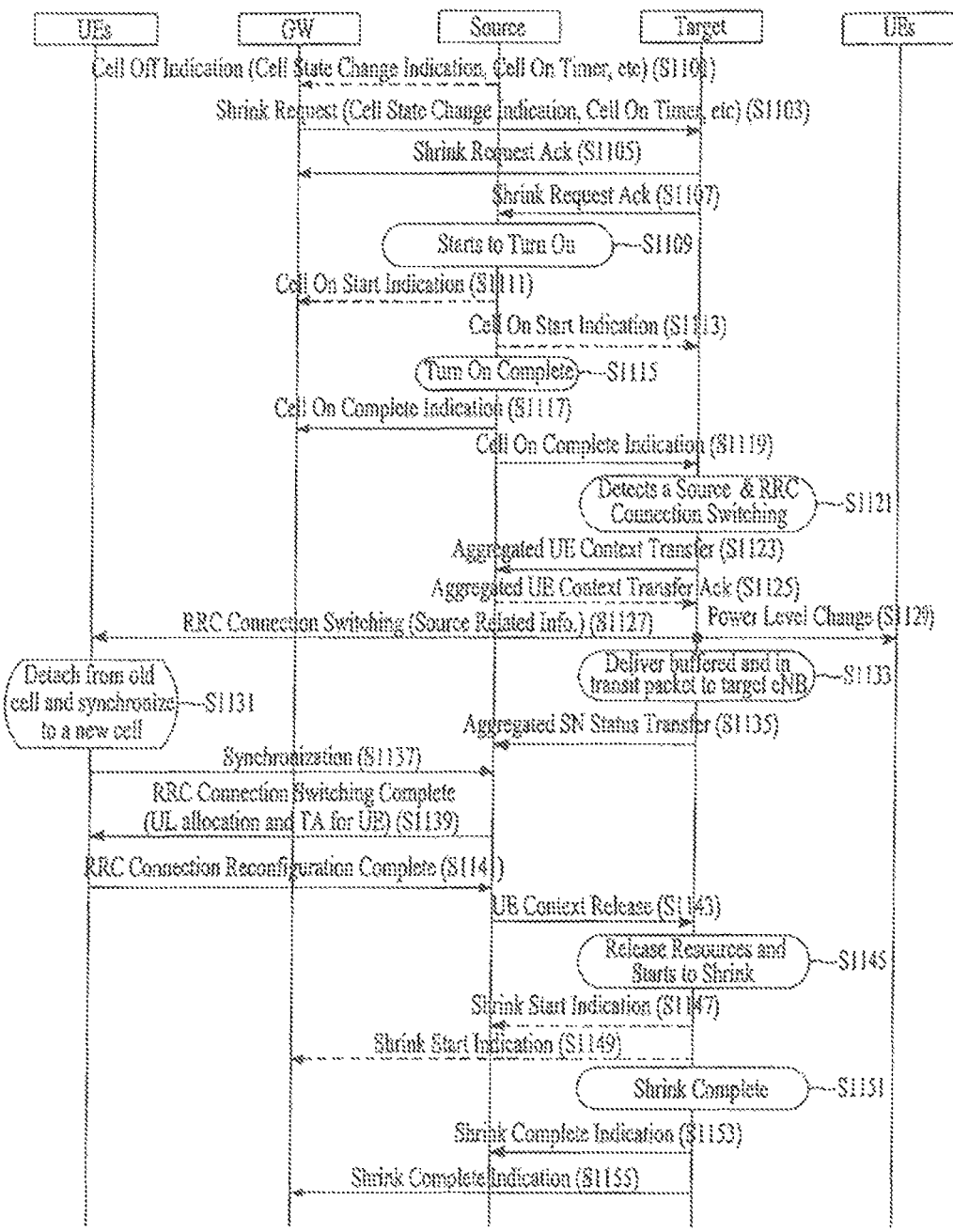
FIG. 11 illustrates an alternative method for the Shrink Request through Small Cell Specific GW (or MME/S-GW).

FIG. 11 illustrates an alternative method for the Shrink Request through Small Cell Specific GW (or MME/S-GW).

The network of FIG. 11 includes the Small cell specific Gate Way (S-GW, MME, or O&M), one or more Source small cells (SSCs), one or more the Target small cell (TSCs), and one or more UEs. However, for convenience of explanation of the present invention, FIG. 11 depicts just one SSC and one TSC but there exist un-shown SSCs and TSCs. In addition, the SSC is going to attempt turn on soon and the TSC is going to shrink the cell coverage. In this case, the SSC can be referred to an on-and-off small cell or a first cell, and the TSC can be referred to a shrink-and-expand small cell or a second cell.

Referring to FIG. 11 the SSC which is going to turn on transmits a Cell On Indication message to the S-GW in order to notify the turn on state. The Cell On Indication message includes a Cell State Change Indication parameter indicating the cell status and a Cell On Timer parameter (S1101).

By receiving the Cell On Indication message, the S-GW can detect that the SSC (i.e., the one-and-off small cell) will be turned on soon by decoding the Cell State Change Indication parameter. So, the S-GW notifies such state change to the TSC (i.e., the shrink-and-expand small cell) by transmitting the Shrink Request message. The Shrink Request message can be transferred via air interface (S1103).

At the step of S1103, the Shrink Request message includes the Cell State Change Indication parameter representing the cell state whether the cell is turned on and the Cell On Timer parameter indicating the duration for the cell on process, and some other required information (e.g., information to identify the SSC). For example, such information can contain the information needed for admission control at the SSC (i.e., on-and-off small cells). Optionally, the Shrink Request message can be originally sent from the SSC.

The Cell On Timer parameter can be set in a number of ways. For example, the Cell On Timer can start (1) when the S-GW (or MME/S-GW, O&M) sends Shrink Request message to the TSC, or (2) when the TSC receive Shrink Request message.

Regardless of the option stated above, the S-GW (or MME/S-GW, O&M) should clearly inform the TSCs about when the SSC will complete turning their power on. The purpose of using the Cell On Timer parameter is that the TSC should not start shrinking its coverage before the SSC finishes turning its power on and switching of RRC connection for corresponding UEs.

Referring back to FIG. 11, the TSC transmits the Shrink Request ACK message acknowledging the successful reception of the Shrink Request message to the S-GW and the SSC (S1105, S1107).

After receiving the Shrink Request ACK message, the SSC starts power on process during the time period indicated by the Cell on Timer parameter (S1109).

Optionally, when the SSC starts turning their power on, it sends the Cell On Start Indication message indicating the power on process has been started to the S-GW and corresponding TSC, respectively (S1111, S1113).

When the SSC finishes turning their power on process, it transmits the Cell On Complete indication message indicating the cell on process is complete to the S-GW (or MME/S-GW, O&M) and corresponding the TSC, respectively (S1117, S1119).

After receiving the Cell on Complete indication message, the TSC detects the SSC and the necessity of RRC Connection Switching. So, the TSC transmits the Aggregated UE Context Transfer message to the SSC (S1121, S1123).

The Aggregated UE Context Transfer message can be interpreted by the SSC as the implicit RRC Connection Switching request for the UEs serviced by the TSC. In this case, the sending of such information should be done after the TSC knows that the SSC completes turning its power on and before the TSC initiates shrinking its coverage.

Optionally, the SSC returns the Aggregated UE Context Transfer ACK message to indicate to the TSC the successful reception of UE Context related to the RRC Connection Switching (S1125).

As an alternate option, in order to reduce the processing time, the sending of Aggregated UE Context Transfer message might also be done immediately after the SSC receives the Shrink Request AAC from the TSC.

The TSC transmits the RRC Connection Switching message to the RRC connected UEs under its coverage. The RRC Connection Switching message includes information related to the identities of the SSC and the period during which the UEs should finish RRC Connection Switching to the SSC. Such information includes any data that can be used to identify the SSC. This is interpreted by the UEs as the RRC Connection Switching Request to the specified SSC (S1127).

The TSC broadcast to the UEs under its coverage about the power level change. While broadcasting the indication on power level changes, the TSC also broadcast the information about at which the changed power level will be applied and used for the corresponding UEs. Besides, such information can be also broadcasted to the UEs on idle mode under the TSC (S1129).

During the process, optionally, the sequence of sending the information about the SSC and the Aggregated UE Contexts can be reversed. That is, after the TSC notifies the RRC connected UEs about the information identifying the SSC first, the TSC sends the Aggregated UE Contexts Transfer message to the SSC.

To reduce the processing time, alternatively, the sending of Aggregated UE Context Transfer message might also be done immediately after the SSC receives the Shrink Request ACK message from the TSC.

The RRC Connection Switching message includes any data that can be used to identify the SSC. This is interpreted by the UEs as RRC connection switching request to the specified SSC. So, the UEs which have received the RRC Connection Switching message are able to detach from old cell (i.e., the TSC) (S1131).

In addition, after transmitting the RRC Connection Switching message to the UEs, the TSC delivers the buffered packets to the SSC (S1133).

The TSC then sends the Aggregated SN Status Transfer message to the SSC. The Aggregated SN Status Transfer message represents the packet sequence number to be transmitted to the SSC (S1135).

During the procedure, optionally, the sequence of sending the information about the SSC and the Aggregated UE contexts Transfer message can be reversed. That is, after the TSC notifies the RRC connected UEs about the information identifying the SSC first, the TSC sends the Aggregated UE contexts Transfer message to the SSC.

The UEs receiving the RRC Connection Switching message performs synchronization with the SSC (S1137).

After the SSC performs synchronization with the UEs, the SSC transmits the RRC Connection Switching Complete message to the corresponding UEs regarding this procedure (S1139).

The RRC Connection Switching Complete message includes uplink resource allocation information and timing advance (TA) information to be used in the SSC. So, the UEs receiving the RRC Connection Switching Complete message can transmit the RRC Connection Reconfiguration Complete message based on the uplink allocation information and the TA information to the SSC (S1141).

After that, the SSC transmits the UE Context Release message requesting that the TSC release the resources for the UEs. When the TSC receives the UE Context Release message from the SSC, the TSC releases the resource for the UEs and then start to shrink its coverage (S1143, S1145).

Optionally, when the TSC starts shrinking its coverage, the TSC transmits the Shrink Start Indication message indicating the start of the coverage shrinking to the SSC and the S-GW (S1147, S1149).

When the TSC finishes shrinking its coverage, the TSC transmits a Shrink Complete Indication message indicating the shrinking is finished to the corresponding SSC and S-GW, respectively (S1153, S1155).

At the procedure illustrated in FIG. 11, the UEs do not need to report the measurement result for the RRC Connection Switching (as in the case of HO preparation) to the TSC.

When the UEs obtain the information about the identities of the SSC and the period during which the UEs should complete the RRC connection switching to the SSC by receiving the RRC Connection Switching message at the step S1023. Then, the UEs can start synchronization to the SSC. The RRC Connection Switching message contains any data that can be used to identify the SSC. Such information can be sent from the network to the UEs by broadcasting message, such as a common control signaling (e.g., System Information (SI)). Besides, such information can be sent from the network to the UEs through RRC message.

When the RRC Connection Switching process is successfully finished to the SSC, the UEs resume communication with the network through the SSC.

4. Implementation Apparatus

Figure 12:
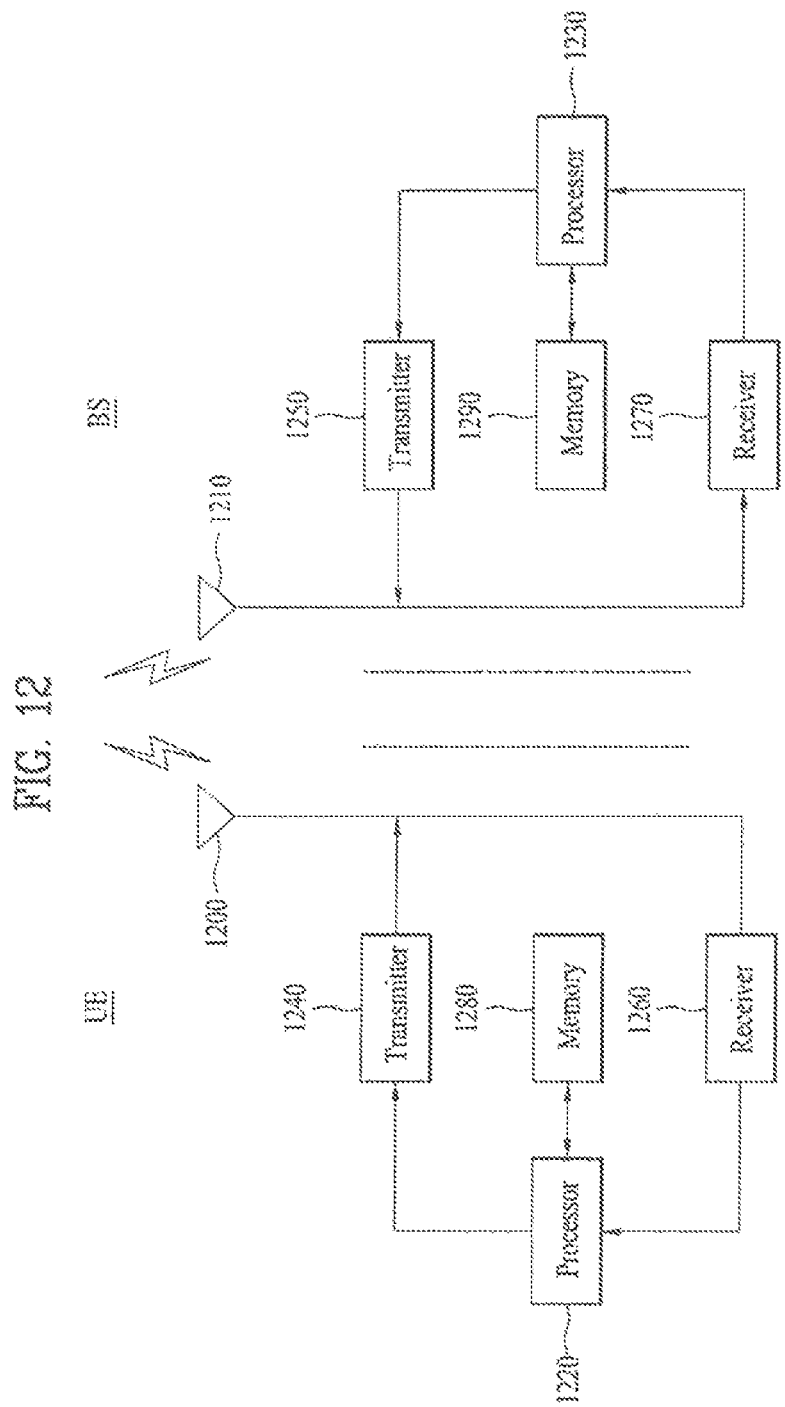
FIG. 12 illustrates apparatus for implementing the method described in FIGS. 1 to 11.

The apparatus described with reference to FIG. 12 can implement the methods described in FIGS. 1 to 11.

A UE may operate as a transmitter in uplink and operate as a receiver in downlink. In addition, a BS (eNB) may operate a receiver in uplink and operate as a transmitter in downlink.

That is, the UE and the BS may respectively include transmitter 1240 and 1250 and receiver 1260 and 1270, in order to control transmission and reception of information, data and/or message. The UE and the BS may include antennas 1200 and 1210 for transmitting/receiving information, data and/or messages, respectively.

The UE and the BS may include processors 1220 and 1230 for performing the above-described embodiments of the present invention and memories 1280 and 1290 for temporarily or permanently storing processing procedures of the processors, respectively.

The embodiments of the present invention may be implemented using the above-described components and functions of the UE and the BS. The processor of the BS can detect whether to cell on or off according to the state of the BS (i.e., the SSC). In this case, the BS informs the states of the BS by sending the Cell on/off Indication message to the S-GW. The specific cell on/off processes can be referred to the explanations corresponding to FIGS. 8 to 11. Although FIG. 12 does not disclose the elements of the S-GW, the all elements included in the BS can be adapted to the S-GW. Accordingly, the function described for the BS also can be applied to the S-GW in view of communication between the BS and the S-GW.

The transmitter and the receiver included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 12 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 1280 and 1290 so that it can be driven by the processors 1220 and 1230. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The present invention is applicable to various wireless access systems. Examples of the various wireless access systems include a 3$^{rd}$ Generation Partnership Project (3GPP) system, a 3GPP2 system and/or an Institute of Electrical and Electronic Engineers (IEEE) 802.xx system. The embodiments of the present invention are applicable to all technical fields using the various wireless access systems in addition to the various wireless access systems.

The invention claimed is:

1. A method for controlling a small cell on or off procedure in a Small cell specific Gate Way (S-GW), the method comprising:
   receiving a cell indication message from a Source Small Cell (SSC), wherein the cell indication message includes a cell state change indication parameter indicating whether the SSC is to be on or off and a cell on/off timer parameter indicating a time duration for a cell on process or a cell off process;
   transmitting request message requesting to expand or shrink a cell coverage of a Target Small Cell (TSC) according to the cell state change indication parameter; and receiving a complete indication message indicating the cell on process or the cell off process is complete after the time duration indicated by the cell on/off timer parameter from the SSC.

2. The method according to claim 1, wherein the cell indication message further includes a time to start cell off parameter indicating when the cell on process or the cell off process is performed.

3. The method according to claim 1, further comprising:
receiving an expand complete indication message indicating a coverage of the TSC is expanded from the TSC, if the cell state change indication parameter indicates that the SSC it to be off; or
receiving an shrink complete indication message indicating the coverage of the TSC is shrunk from the TSC, if the cell state change indication parameter indicates that the SSC it to be on.

4. A method for controlling a small cell on or off procedure in a target small cell (TSC), the method comprising:
receiving a request message from a Small cell specific Gate Way (S-GW), wherein the request message includes a cell state change indication parameter indicating whether a source small cell (SSC) is to be on or off and a cell on/off timer parameter indicating a time duration for a cell on process or a cell off process;
performing a expanding process or a shrinking process according to the cell state change indication parameter;
transmitting a first complete indication message indicating expanding a coverage of the TSC or shrinking the coverage of the TSC after complete the expanding process or the shrinking process; and
receiving a second complete indication message indicating the cell on process or the cell off process is complete after the time duration indicated by the cell on/off timer parameter from the SSC.

5. The method according to claim 4, further comprising:
performing a synchronization process with a user equipment (UE) which is controlled by the SSC when the cell state change indication parameter indicating the SSC is to be turn off; and
performing a Radio Resource Control (RRC) connection switching process with the UE for servicing a RRC connection to the UE.

6. The method according to claim 4, wherein the cell indication message further includes a time to start cell off parameter indicating when the cell on process or the cell off process is performed.

7. The method according to claim 4, further comprising:
transmitting a user equipment (UE) context release message requesting to release resources of the UE to the SSC if the cell state change indication parameter indicating the SSC is to be turn off; or
receiving the UE context release message requesting to release resources of the UE from the SSC if the cell state change indication parameter indicating the SSC is to be turn on.

8. Small cell specific Gate Way (S-GW) for controlling a small cell on or off procedure, the S-GW comprising:
a transmitter;
a receiver; and
a processor for controlling the small cell on or off procedure,
wherein the processor is configured to:
receive a cell indication message from a Source Small Cell (SSC) by controlling the receiver, the cell indication message including a cell state change indication parameter indicating whether the SSC is to be on or off and a cell on/off timer parameter indicating a time duration for a cell on process or a cell off process;
transmit request message requesting to expand or shrink a cell coverage of a Target Small Cell (TSC) according to the cell state change indication parameter, by controlling the transmitter; and
receive a complete indication message indicating the cell on process or the cell off process is complete after the time duration indicated by the cell on/off timer parameter from the SSC, by controlling the receiver.

9. The S-GW according to claim 8, wherein the cell indication message further includes a time to start cell off parameter indicating when the cell on process or the cell off process is performed.

10. The S-GW according to claim 8, wherein the processor is further configured to:
receive an expand complete indication message indicating a coverage of the TSC is expanded from the TSC by using the receiver, if the cell state change indication parameter indicates that the SSC it to be off; or
receive an shrink complete indication message indicating the coverage of the TSC is shrunk from the TSC by using the receiver, if the cell state change indication parameter indicates that the SSC it to be on.

11. A target small cell (TSC) for supporting a small cell on or off procedure, the TSC comprising:
a receiver;
a transmitter; and
a processor for supporting the small cell on or off procedure,
wherein the processor is configured to:
receive a request message from a Small cell specific Gate Way (S-GW) by using the receiver, the request message including a cell state change indication parameter indicating whether a source small cell (SSC) is to be on or off and a cell on/off timer parameter indicating a time duration for a cell on process or a cell off process;
perform a expanding process or a shrinking process according to the cell state change indication parameter;
transmit a first complete indication message indicating expanding a coverage of the TSC or shrinking the coverage of the TSC after complete the expanding process or the shrinking process, by using the transmitter; and
receive a second complete indication message indicating that the cell on process or the cell off process is complete after the time duration indicated by the cell on/off timer parameter from the SSC, by using the receiver.

12. The TSC according to claim 11, wherein the processor of TSC is further configured to:
perform a synchronization process with a user equipment (UE) which is controlled by the SSC when the cell state change indication parameter indicating the SSC is to be turn off; and
perform a Radio Resource Control (RRC) connection switching process with the UE for servicing a RRC connection to the UE.

13. The TSC according to claim 11, wherein the cell indication message further includes a time to start cell off parameter indicating when the cell on process or the cell off process is performed.

14. The TSC according to claim 11, wherein the processor of the TSC is further configured to:

transmit a user equipment (UE) context release message requesting to release resources of the UE to the SSC if the cell state change indication parameter indicating the SSC is to be turn off; or receive the UE context release message requesting to release resources of the UE from the SSC if the cell state change indication parameter indicating the SSC is to be turn on.

* * * * *